(12) United States Patent
Chang (10) Patent No.: US 7,557,554 B2
(45) Date of Patent: Jul. 7, 2009

(54) VOLTAGE/CURRENT CONTROL APPARATUS AND METHOD

(75) Inventor: Yu Cheng Chang, Cupertino, CA (US)

(73) Assignee: Alpha & Omega Semiconductor, Ltd, Hamilton (BM)

( * ) Notice: Subject to any disclaimer, the term of this patent is extended or adjusted under 35 U.S.C. 154(b) by 82 days.

(21) Appl. No.: 11/861,154

(22) Filed: Sep. 25, 2007

(65) Prior Publication Data

US 2009/0079409 A1    Mar. 26, 2009

(51) Int. Cl.
*G05F 1/575* (2006.01)
*G05F 1/618* (2006.01)

(52) U.S. Cl. ...................... 323/284; 323/285
(58) Field of Classification Search ................ 323/224, 323/265, 271, 282, 284, 285, 351
See application file for complete search history.

(56) References Cited

U.S. PATENT DOCUMENTS

| | | | | |
|---|---|---|---|---|
| 6,343,026 B1 | 1/2002 | Perry | ............................ | 363/65 |
| 6,381,159 B2 | 4/2002 | Oknaian et al. | ................ | 363/98 |
| 6,396,250 B1 * | 5/2002 | Bridge | ........................ | 323/283 |
| 6,825,644 B2 | 11/2004 | Kernahan et al. | ............ | 323/283 |
| 7,045,993 B1 * | 5/2006 | Tomiyoshi | ................... | 323/224 |
| 7,098,640 B2 | 8/2006 | Brown | ......................... | 323/283 |
| 7,292,018 B2 * | 11/2007 | Chen | ............................ | 323/282 |
| 2006/0043943 A1 * | 3/2006 | Huang et al. | ................. | 323/222 |
| 2008/0024101 A1 * | 1/2008 | Huang et al. | ................. | 323/282 |

OTHER PUBLICATIONS

Intersil Data Sheet HIP6004B, "Buck and Synchronous-Rectifier (PWM) Controller and Output Voltage Monitor," Oct. 2003.
Vahid Yousefzadeh et al. "Sensorless Optimization of Dead Times in DC-DC Converters with Synchronous Rectifiers," 2006 IEEE Power Electronics, vol. 21, pp. 994-1002, Jul. 2006.
International Search Report and Written Opinion of The International Searching Authority dated Mar. 31, 2009 for the International patent application No. PCT/US2008/076075, 12 pages.

* cited by examiner

*Primary Examiner*—Gary L Laxton
(74) *Attorney, Agent, or Firm*—Joshua D. Isenberg; JDI Patent (57) ABSTRACT

A voltage/current control apparatus and method are disclosed. The apparatus includes a low-side field effect transistor (FET) having a source, a gate and a drain, a high-side field effect transistor (FET) having a source, a gate and a drain, a gate driver integrated circuit (IC), a sample and hold circuit, and a comparator configured to produce a trigger signal at the output when a sum of the first and second input signals is equal to a sum of the third and fourth input signals, wherein the trigger signal is configured to trigger a beginning of a new cycle by turning the gate of the high-side FET "on" and the gate of the low-side FET "off".

19 Claims, 6 Drawing Sheets

FIG. 1

(PRIOR ART)

VOLTAGE/CURRENT CONTROL APPARATUS AND METHOD

FIELD OF THE INVENTION

This invention generally relates to output voltage/current regulation and more particularly to a voltage/current integrated circuit controller.

BACKGROUND

Circuits for controlling voltage and current using high-side and low-side field effect transistors (FETs) have many applications involving regulation of electrical power supplies. In such applications, current is supplied to a load through a junction between the source of a high-side FET and the drain of a low-side FET. A capacitor is often coupled in parallel with the load and an inductor is coupled in series with the capacitor and load. During part of a cycle of operation the high-side FET is turned on and the low-side FET is turned off allowing current to flow through the high-side FET to the inductor, capacitor and load. The current to the load increases as the capacitor charges. When the voltage across the load reaches some target level, the high-side FET is switched off and the low-side FET is switched on. The current through the load decreases as the capacitor discharges. The circuit is normally set up to trigger the switching of the gates to high-side on and low-side off if the current through the inductor changes from increasing to decreasing but the output voltage has not. This can lead to output voltage instability if the capacitor has a low equivalent series resistance (ESR).

Figure 1:
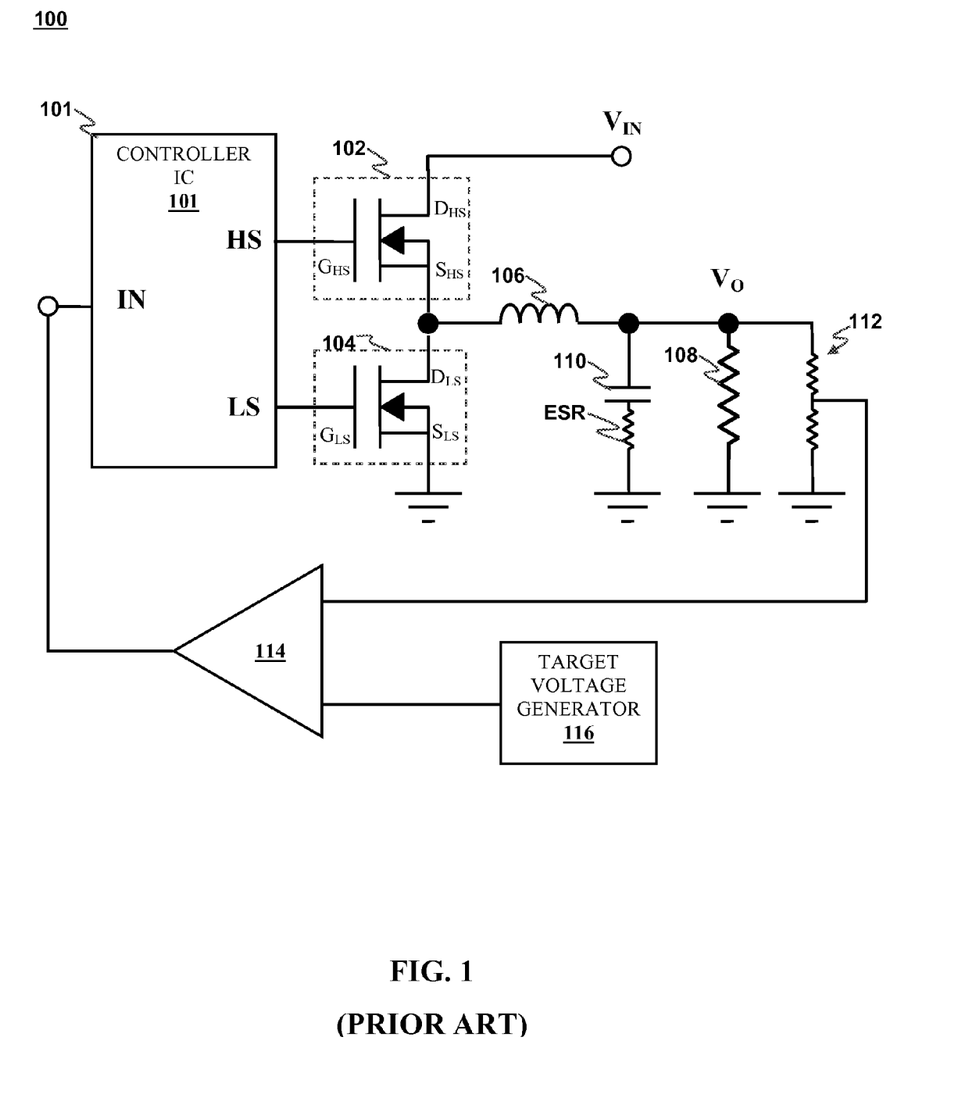
FIG. 1 is a circuit diagram of a portion of a switching controller of the prior art.

FIG. 1 is a circuit diagram of a voltage/current controller circuit 100 of the prior art. The switching controller 100 includes a controller integrated circuit (IC) 101 a high-side FET 102 and a low-side FET 104. A drain $D_{HS}$ of the high-side FET 102 is electrically coupled to an input voltage $V_{IN}$, a source $S_{HS}$ of the high-side FET 102 is electrically coupled to the drain $D_{LS}$ of the low-side FET 104. A source $S_{LS}$ of the low-side FET is electrically coupled to ground. Gates $G_{HS}$ and $G_{LS}$ of the high-side FET and low-side standard FET are electrically coupled to high-side output HS and a low-side output LS of the controller IC 101. When a sufficient voltage is applied to a gate of one of the FETS, current may flow between the corresponding source and drain. During voltage and/or current control operation an "on" voltage is typically applied to the high-side gate $G_{HS}$ when an "off" voltage is applied to the low-side gate $G_{LS}$ and vice versa. The controller IC 101 may receive an input signal at an input pin IN that drives the voltages supplied by the high-side and low-side outputs. An inductor 106 is coupled at a junction between a source $S_{HS}$ of the high-side FET 102 and a drain $D_{LS}$ of the low-side FET 104. A load 108 is coupled between the inductor 106 and ground. The voltage across the load 108 is referred to herein as the output voltage $V_O$.

The circuit 100 may operate in a mode referred to as constant on time. In this mode, the gates $G_{HS}$, $G_{LS}$ are held on or off for fixed periods of time after switching from "on" to "off" or vice versa. The output voltage is sampled e.g., using a voltage divider network 112 to provide a feedback voltage $V_{FB}$ and fed to a comparator 114 which compares the output voltage to a desired Target voltage $V_{tar}$ from a target voltage generator 116. When the feedback voltage $V_{FB}$ is equal to a target voltage $V_{tar}$, the comparator triggers the controller IC to switch the gates from high-side on/low-side off to low-side on, high-side off or vice versa. In many current/voltage regulation applications it is common to couple a capacitor 110 to ground in parallel with the load 108. The capacitor delays the output voltage across the load 108 relative to the output current through the load 108. This can lead to an unstable output voltage $V_O$ in constant on-time operation as discussed below.

Figure 2A:
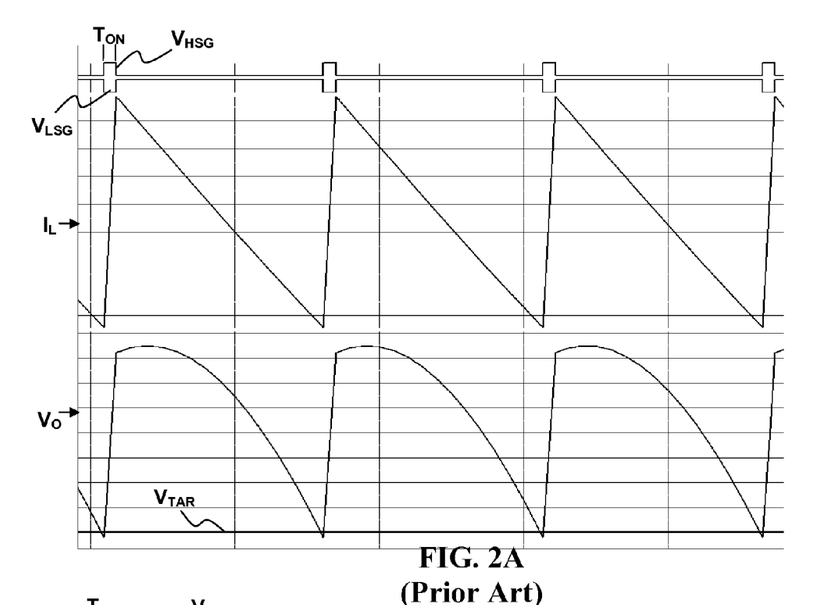
FIGS. 2A-2B are timing diagrams illustrating examples of operation of a switching controller of the prior art.
Figure 2B:
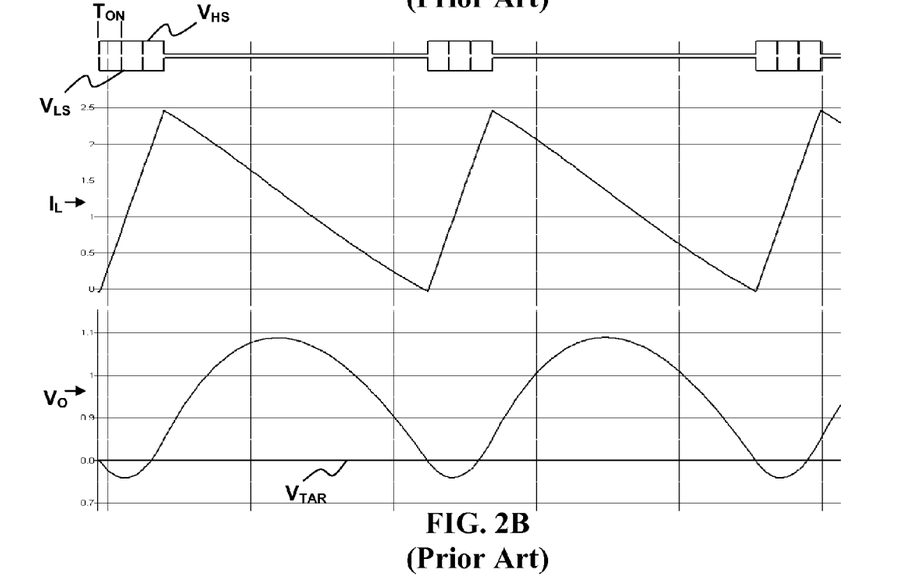

The above-described operation of the circuit 100 essentially relies on a ripple in the output voltage $V_O$ in order to regulate the output current. Unfortunately, output voltage ripple is often undesirable in certain applications of such circuits. It would be desirable to control the ESR so that the output voltage turns (changes from falling to rising) during the on-time. This sort of operation may be achieved if the ESR is sufficiently large that the behavior of the capacitor 110 is more "resistor-like", i.e., the phase of the output voltage $V_O$ tends to be close to the phase of the current IL through the inductor 106. An example of such operation is illustrated in FIG. 2A. Each cycle starts by switching the high-side gate "on" and the low-side gate "off". In "constant on-time" operation, this condition remains for a fixed period of time $T_{ON}$ after which the high-side gate is switched off and the low-side gate is switched on. This condition remains until the output voltage falls below the target voltage $V_{tar}$. Note also that the gate voltages $V_{HSG}$ and $V_{LSG}$ switch from high to low once per cycle. If the ESR of the capacitor 110 is too small, however, the circuit behavior of the capacitor 110 is more "capacitor-like" meaning that the phase of the output voltage $V_O$ tends to lag behind the phase of the inductor current $I_L$ as shown in FIG. 2B. The output voltage may become unstable if the feedback voltage $V_{FB}$ lags so far behind the current that the comparator 114 is not able to trigger a new cycle until after the constant "on" time has expired. As noted above, the circuit 100 is normally set up to trigger the switching of the gates to high-side on and low-side off if the inductor current $I_L$ changes from increasing to decreasing but the output voltage $V_O$ has not. As a result, the gate voltages $V_{HSG}$ and $V_{LSG}$ may switch more than once per cycle and the output becomes unstable.

To overcome this, it is desirable to select the capacitor 110 such that it has an equivalent series resistance (ESR) that is large enough that the output voltage $V_O$ is more in phase with the current $I_L$ from the inductor 106 and the operation is stable as in FIG. 2A. For example, a ceramic capacitor with a 20 milliohm ESR may be replaced with a tantalum capacitor having an ESR of about 200-600 milliohms. However, this may be difficult to engineer since the controller IC 101 and FETS 102, 104 are often packaged by a first manufacturer and the load 108 and capacitor 110 are designed and implemented by a second manufacturer. Thus, the ESR is often out of control of the first manufacturer. Furthermore, the ESR of the capacitor 110 often depends on factors such as the manufacturing method, material and temperature of the capacitor, that are out of the control of both manufacturers.

One prior art solution is to emulate the on-time current through the inductor 110 with a current emulator and use the emulated current to control triggering of the FETs 102, 104. In this manner, the output voltage may be kept in phase with the emulated current. Unfortunately, the current emulator tends to be complicated to implement and may require additional hardware for which space may be limited. In addition, the inductance of the inductor 106 must be in a specific range for the current emulator to operate. Since other factors may determine the choice of inductor, this solution is not always a viable one. It is within this context that embodiments of the present invention arise.

BRIEF DESCRIPTION OF THE DRAWINGS

Objects and advantages of the invention will become apparent upon reading the following detailed description and upon reference to the accompanying drawings in which.

DESCRIPTION OF THE SPECIFIC EMBODIMENTS

Although the following detailed description contains many specific details for the purposes of illustration, anyone of ordinary skill in the art will appreciate that many variations and alterations to the following details are within the scope of the invention. Accordingly, the exemplary embodiments of the invention described below are set forth without any loss of generality to, and without imposing limitations upon, the claimed invention.

Embodiments of the present invention work by superimposing a voltage proportional to the inductor current on the feedback voltage $V_{FB}$. Embodiments of the present invention may utilize a modified circuit of the type shown in FIG. 1. The inductor current includes both a direct current (DC) component $I_{dc}$ and an alternating current (AC) component $I_{ac}$ or ripple. The inductor current $I_L$ may be expressed as $I_L(t)=I_{ac}(t)+I_{dc}(t)$. Such current information may be superposed on the feedback voltage $V_{FB}$ by multiplying $I_L$ by the drain-source resistance $R_{ds\text{-}on}$ of the FETs 102, 104 and an optional gain factor G to obtain:

$$V_{FB}+(I_{ac}(t)+I_{dc}(t))*R_{ds\text{-}on}*G$$

From the quantity in parentheses, one may subtract the value of the DC component of the current from a previous cycle $I_{dc}(t-\Delta t)$. The DC component from the previous cycle $I_{dc}(t-\Delta t)$ may be obtained using a sample and hold circuit. Since the value of the AC component of inductor current $I_{ac}$ averages out to zero, the difference $\Delta I(t)=I(t)-I(t-\Delta t)$ may be expressed as $\Delta I(t)=I_{dc}(t)-I_{dc}(t-\Delta t)$. The quantity $(V_{FB}+(I_{ac}(t)+I_{dc}(t))*R_{ds\text{-}on}*\text{Gain})$ may be compared to the target voltage $V_{tar}$.

According to a first embodiment of the invention, a voltage/current control apparatus may include a low-side FET, a high-side FET, a gate driver integrated circuit (IC), a sample and hold circuit and a comparator. The low-side FET has a source, a gate and a drain. The high-side FET also has a source, gate and drain. The drain of the low-side FET is coupled to ground. The source of the high-side FET and the drain of the low-side FET are electrically coupled at a junction. The drain of the high-side FET is adapted to be coupled to an input voltage source. A gate driver integrated circuit (IC) having a high-side gate driver output electrically coupled to the gate of the high-side FET and a low-side gate driver output electrically coupled to the gate of the low-side FET. The sample and hold circuit is configured to sample and store a first input signal proportional a current through the junction to a load during a portion of a cycle when an "on" voltage is applied to the gate of the low-side FET.

What matters is that the comparator triggers the start of a new cycle of when the second signal is equal to the sum of the third and fourth signals minus the first signal, e.g.:

$$V_{tar}=I_L R_{ds\text{-}on}+V_{FB}-I_{S/H}R_{ds\text{-}on}.$$

One way to do this is to make two combination signals CS1, CS2 and feed them into the comparator. $\text{CS1}=I_{S/H}R_{ds\text{-}on}+V_{tar}$. $\text{CS2}=I_L R_{ds\text{-}on}+V_{FB}$. The comparator triggers when CS1=CS2.

The comparator has an output coupled to an input of the gate driver IC. The comparator is configured to receive as inputs some combination of the first input signal with second, third and fourth input signals. The second input signal is proportional to a desired target voltage. The third input signal is proportional to a current through the junction to the load during a current cycle. The fourth input signal is proportional to a output voltage across the load. The comparator is configured to produce a trigger signal at the output when a sum of the first and second input signals is equal to a sum of the third and fourth input signals. The trigger signal is configured to trigger a beginning of a new cycle by turning the gate of the high-side FET "on" and the gate of the low-side FET "off".

According to a second embodiment of the invention, a method for a voltage/current control may be implemented in an apparatus having a low-side FET with a source gate and drain and a high-side FET having a source gate and drain. The source of the high-side FET and the drain of the low-side FET are electrically coupled to each other at a junction, and a load is electrically coupled to the junction. At the start of a cycle, the high-side FET is turned on and the low-side FET is turned off for a fixed time $T_{ON}$. After the fixed time $T_{ON}$ has elapsed, the high-side FET is turned off and the low-side FET is turned on. While the high-side FET is off and the low-side FET is on, first, second, third and fourth signals, are sensed. The first signal is proportional to a current during a sample and hold period. The second signal is proportional to a target voltage across the load. The third signal is proportional to a current to the load. The fourth signal is proportional to a measured voltage across the load. If the second input signal is equal to a sum of the third and fourth input signals minus a stored value of the first signal from a previous cycle the stored value of the first signal is updated with a measured value obtained during the cycle, and a new cycle is started.

Figure 3:
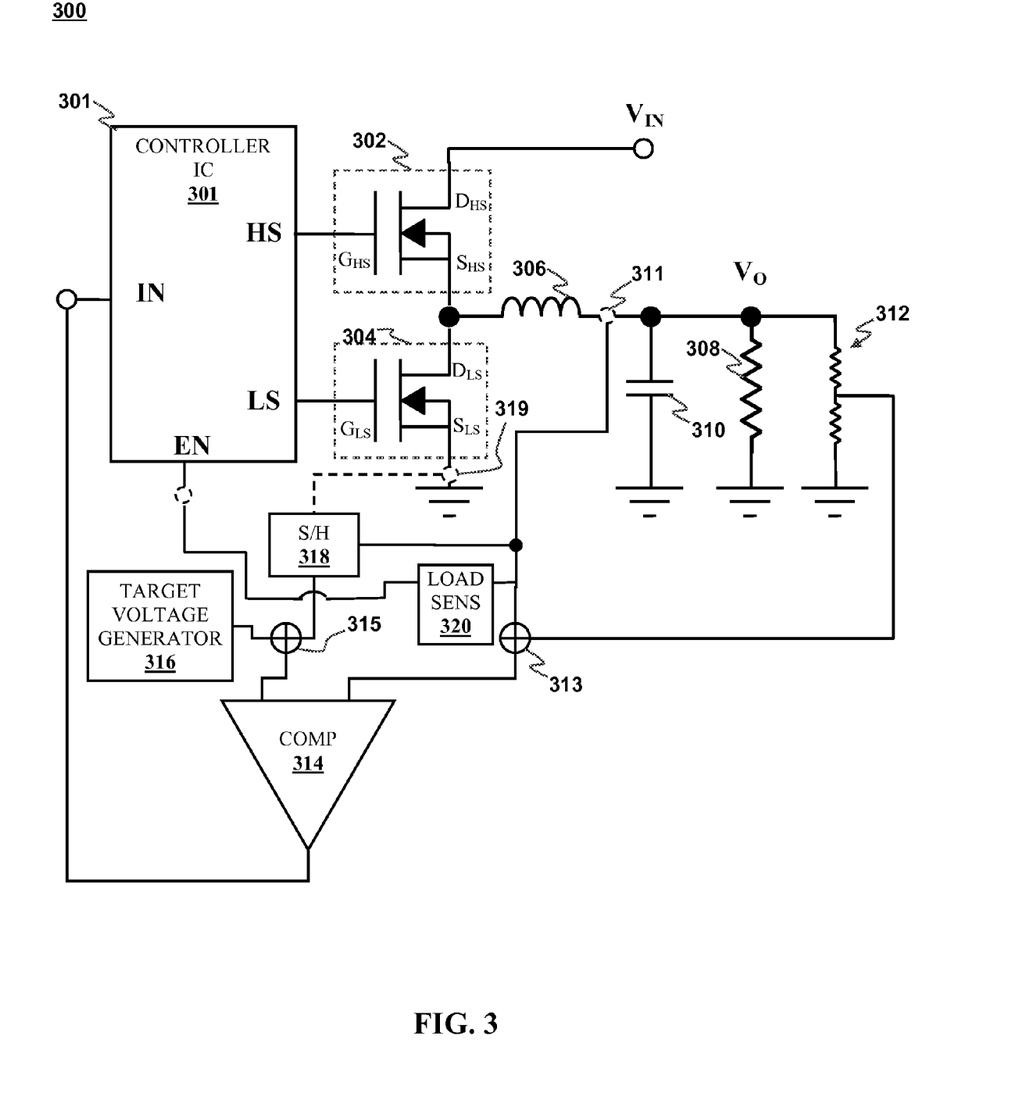
FIG. 3 is a block diagram of a portion of a switching controller apparatus according to an embodiment of the present invention.

FIG. 3 illustrates an example of a voltage/current control apparatus 300 according to the first embodiment of the present invention. The switching controller 300 includes a controller integrated circuit (IC) 301, a high-side FET 302 and a low-side FET 304. A drain $D_{HS}$ of the high-side FET 302 is electrically coupled to an input voltage $V_{IN}$, a source $S_{HS}$ of the high-side FET 302 is electrically coupled to the drain $D_{LS}$ of the low-side FET 304. A source $S_{LS}$ of the low-side FET is electrically coupled to ground. Gates $G_{HS}$ and $G_{LS}$ of the high-side FET and low-side standard FET are electrically coupled to high-side output HS and a low-side output LS of the controller IC 301. When a sufficient voltage is applied to a gate of one of the FETs 302, 304, current may flow between the corresponding source and drain. During voltage and/or current control operation an "on" voltage is typically applied to the high-side gate $G_{HS}$ when an "off" voltage is applied to the low-side gate $G_{LS}$ and vice versa. The controller IC 301 may receive an input signal at an input pin IN that drives the voltages supplied by the high-side and low-side outputs.

An inductor 306 is coupled at a junction between a source $S_{HS}$ of the high-side FET 302 and a drain $D_{LS}$ of the low-side FET 304. A load 308 may be electrically coupled between the inductor 306 and ground. The voltage across the load 308 is referred to herein as the output voltage $V_O$. A capacitor 310 is coupled to ground in parallel with the load 308.

A current sensor 319 is operably coupled between the low-side transistor 304 and the sample and hold circuit 318. The current sensor 319 is configured to produce the first input signal. The first signal ($I_{S/H}R_{ds-on}$) is proportional to a current obtained during a sample and hold period for a previous cycle at a time when the low-side resistor is on and the high-side resistor is off. Note: $I_{S/H}$ could be based on a stored sample of the inductor current or a stored sample of the source-drain current for the low-side resistor. The sample and hold circuit 318 is configured to sample and store the first input signal proportional a current through the junction to a load during a portion of a cycle when an "on" voltage is applied to the gate of the low-side FET. The sample and hold circuit 318 is configured to update a value of the first signal based on a value of the drain-source current during a narrow window of time near an end of the cycle.

A target voltage generator 316 is operably coupled to the first signal combiner 315. The target voltage generator 316 is configured to produce the second input signal $V_{tar}$ proportional to a target voltage across the load 308.

A current sensor 311, which is operably coupled to the junction and proximate to the inductor 306, senses inductor current $I_L$ of the inductor 306 and sends a third signal to a signal combiner 313 and (optionally) to a sample and hold circuit 318. The third input signal is proportional to a current to the load, e.g., the inductor current $I_L$.

The output voltage $V_O$ may be sampled e.g., using a voltage divider network or voltage sensor 312, which is operably coupled to the load 308. The voltage sensor 312 is configured to generate the fourth input, which is a feedback voltage $V_{FB}$ proportional to a measured output voltage $V_O$ across the load 308.

A comparator 314 includes an output coupled to an input IN of the gate driver IC 301. A first signal combiner 315 is coupled to the comparator 314 and is configured to receive the first input signal and the second input signal and produce to the comparator 314 a first combination signal proportional to a sum of the first and second input signals. A second signal combiner 313 is also coupled to the comparator 314 and is configured to receive the first, third and fourth input signals and output to the comparator 314 a combination signal proportional to a sum of the third and fourth input signals minus the first input signal. The comparator 314 is configured to receive as inputs some combination of the first input signal with second, third and fourth input signals from the first and second signal combiners 315 and 313. The comparator 314 is configured to produce a trigger signal at the output when a sum of the first and second input signals is equal to a sum of the third and fourth input signals. The trigger signal is configured to trigger a beginning of a new cycle by turning the gate of the high-side FET "on" and the gate of the low-side FET "off".

The switching controller 300 also includes a load sensing circuit 320 configured to sense a current through the load 308. The load sensing circuit 320 includes an output electrically coupled to an enable input EI of the gate driver IC 301. The load sensing circuit 320 is adapted to produce a signal that turns off the gates of both the high-side FET 302 and the low-side FET 304 when the current $I_L(DC)$ through the load 308 is below a predetermined light load threshold to save on power.

To summarize, the relevant inputs to the comparator 314 are the following four signals:
i) The first signal ($I_{S/H}R_{ds-on}$) is proportional to a current obtained during a sample and hold period for a previous cycle at a time when the low-side resistor is on and the high-side resistor is off. It is noted that $I_{S/H}$ could be based on a stored sample of the inductor current or a stored sample of the source-drain current for the low-side resistor.
ii) The second signal ($V_{tar}$) is proportional to a target voltage across the load 308
iii) The third signal is proportional to a current to the load, e.g., $I_L R_{ds-on}$
iv) The fourth signal is a feedback voltage $V_{FB}$ that is proportional to a measured output voltage $V_O$ across the load 308.

It is important to sample $I_{S/H}$ near the end of a cycle when the low-side FET is on and the high-side FET is off. The sample and hold period is therefore a relatively narrow time window compared to the time for a cycle.

By way of example, the sample-and-hold(s/h) period may be in the rage of about 1 nanosecond to a few tens of nanoseconds to complete one cycle depending on components used in the circuit 300. The sample-and-hold circuit 318 may begin the s/h period when $V_{Tar}+I_{S/H}R_{ds-on}=I_{sens}R_{ds-on}+V_{FB}$, e.g., as determined from the output of the comparator 314. Preferably, the s/h period is long enough to properly update or store a voltage related to $I_{S/H}R_{ds-on}$ into a capacitor or similar device or properly transform the voltage into a memory format. After the s/h period completes, a break time may be inserted if necessary before a new cycle starts.

Figure 4:
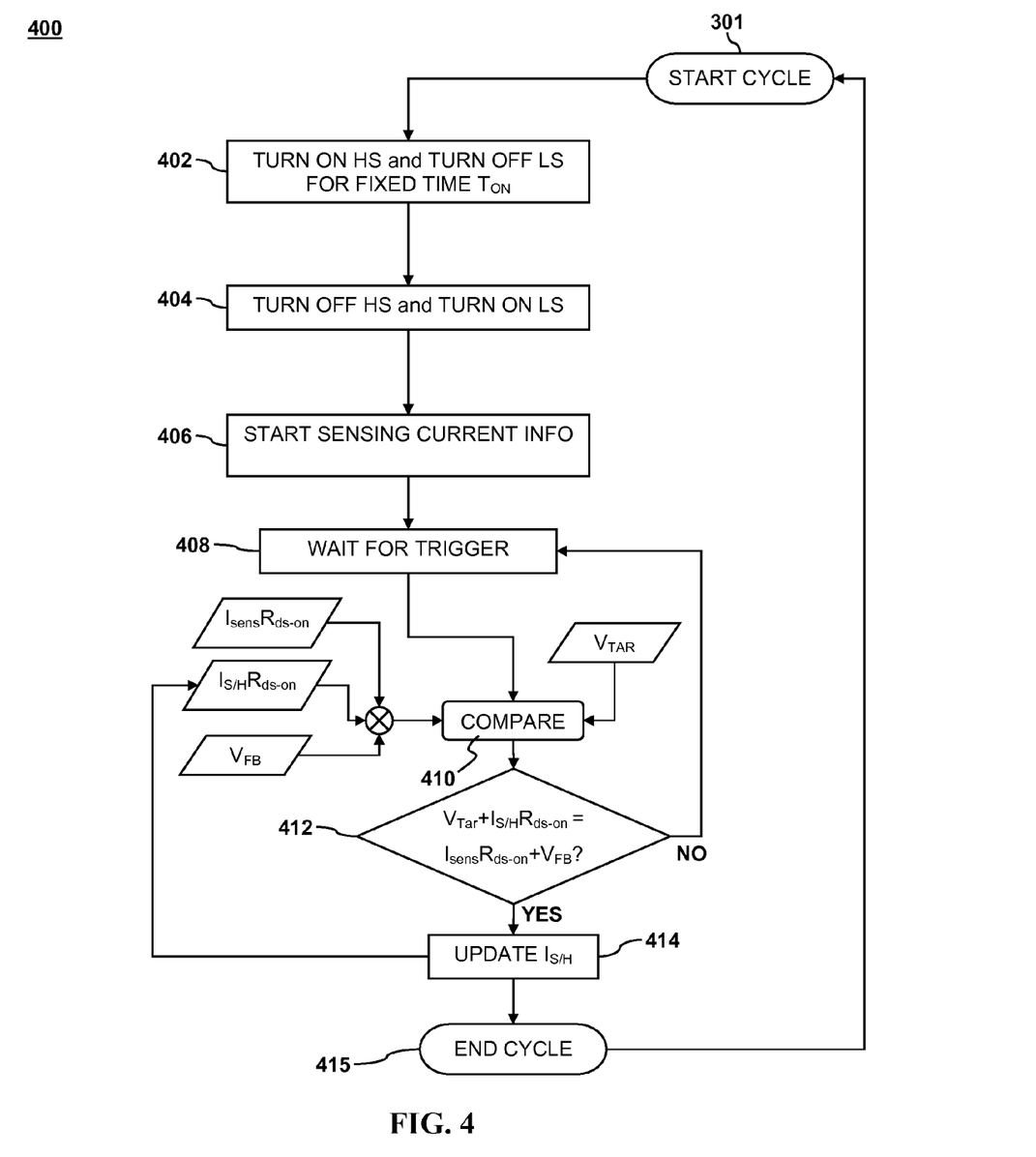
FIG. 4 is a flow diagram illustrating a voltage/current control method according to an embodiment of the present invention.

The apparatus of FIG. 3 may implement a method for current/voltage control. The flow diagram of FIG. 4 illustrates an example of a voltage/current control method 400 according to an embodiment of the present invention. At the start of a cycle 301, the high-side FET is turned on and the low-side FET is turned off for a fixed time $T_{ON}$ as indicated in 402. The high-side FET is then turned off and the low-side FET is turned on after fixed time $T_{ON}$ has elapsed as indicated in 404. While the high-side FET is off and the low-side FET is on, the current information of the first, second, third and fourth signals is sensed as indicated in 406 and waiting for trigger to start a new cycle at 408. As described in FIG. 3, the first signal ($I_{S/H}R_{ds-on}$) is proportional to a current during a sample and hold period, the second signal ($V_{tar}$) is proportional to a target voltage across the load, the third signal ($I_L R_{ds-on}$) is proportional to a current to the load, and the fourth signal ($V_{FB}$) is proportional to a measured voltage across the load.

The current information of the first, second, third and fourth signals are then compared as indicated in 410. If the second input signal is equal to a sum of the third input and the fourth input signals minus a stored value of the first signal from a previous cycle, e.g., $V_{tar}=I_L R_{ds-on}+V_{FB}-I_{S/H}R_{ds-on}$, as indicated in 412, the stored value of the first signal $I_{S/H}R_{ds}$ is updated with a measured value obtained during the cycle as indicated in 414. The old cycle ends and a new cycle is started as indicated in 415. On the other hand, if at 412, if the second input signal is not equal to a sum of the third and fourth input signals minus a stored value of the first signal from a previous cycle, a trigger condition is still awaited at 408.

Figure 5:
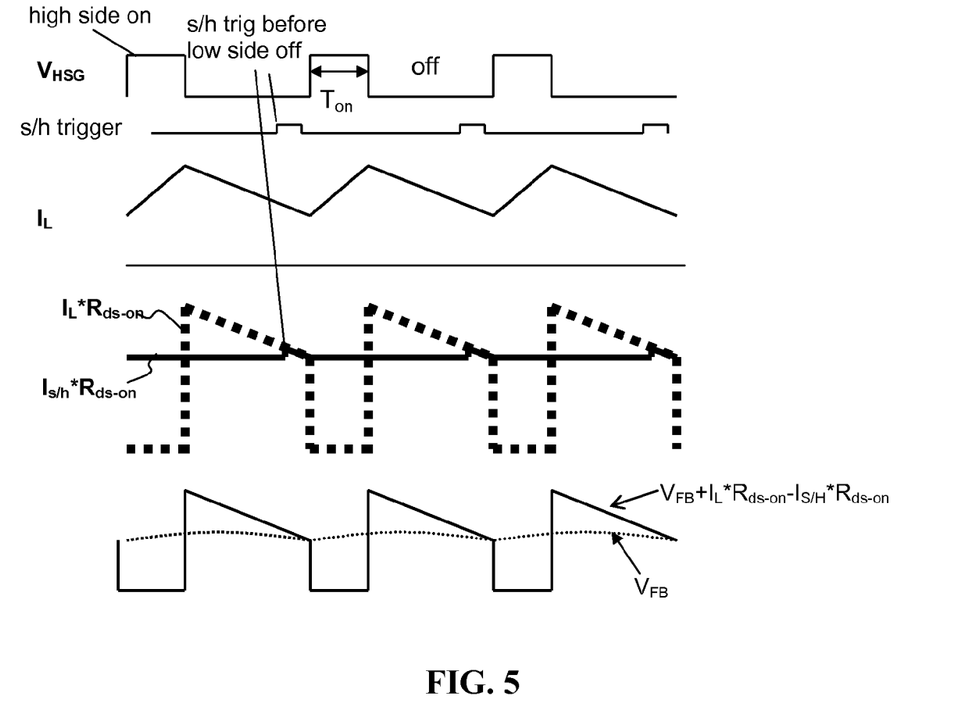
FIG. 5 is a timing diagram illustrating voltage/current control according to an embodiment of the present invention.
Figure 6:
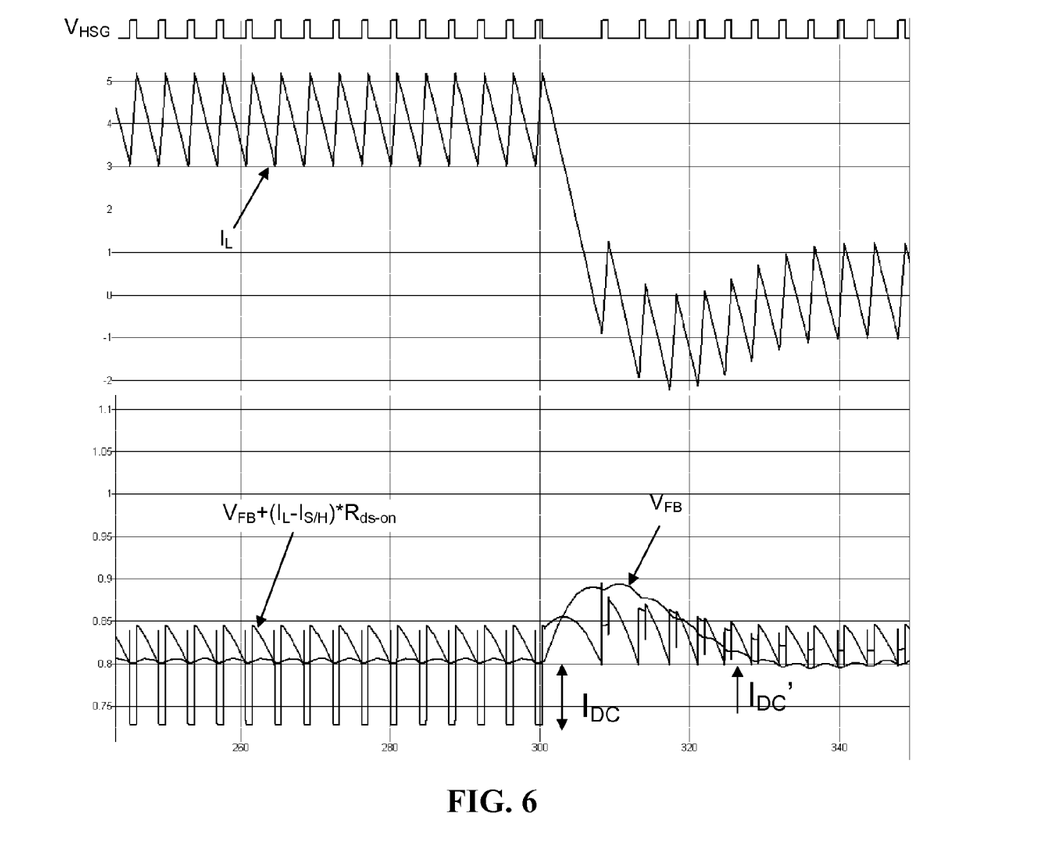
FIG. 6 is timing diagram illustrating an example of operation of an apparatus of the present invention.

Implementation of the method illustrated in FIG. 4 using the apparatus of FIG. 3 may be understood with respect to the timing diagrams illustrated in FIG. 5 and FIG. 6. The top trace shows timing for the gate voltage $V_{HSG}$ applied to the high-side FET 302. The second trace from the top shows the timing for a signal that triggers the sample and hold circuit 318. The third trace from the top shows the inductor current $I_L$ as a function of time. Note that when the high-side FET 302 is turned "on" the inductor current $I_L$ rises and that when the high-side FET 302 is turned "off" the inductor current falls. The fourth trace from the top shows the signals $I_L R_{ds-on}$ and $I_{s/h} R_{ds-on}$ with respect to time. It may be seen from the second and fourth traces that the sample and hold circuit is triggered (i.e., starts sampling the current $I_L$) near the end of a period during which the inductor current $I_L$ is falling, i.e., near the end of the period during which the high-side FET 302 is turned off. For most of the cycle, $I_{s/h} R_{ds-on}$ has the value it had from the end of the previous cycle. It is only during the narrow triggering window indicated in the second trace that the sample and hold circuit 318 samples the value of $I_L R_{ds-on}$ for use with the next cycle.

The fifth trace from the top in FIG. 5 shows the feedback voltage $V_{FB}$ and the combined signal $V_{FB}+(I_{L\_}I_{s/h})R_{ds-on}$ as functions of time. The trigger point is reached when the combined signal $V_{FB}+(I_L I_{s/h})R_{ds-on}$ equals the target voltage $V_{TAR}$. Note that the feedback $V_{FB}$ signal more or less stable.

FIG. 6 illustrates a case in which a circuit of the type depicted in FIG. 3 undergoes a sudden drop in current to the load 308. The top trace in FIG. 6 shows the voltage $V_{HSG}$ applied to the gate of the high-side FET 302. The next trace shows the current $I_L$. The bottom traces show the combined signal $V_{FB}+(I_{L\_}I_{s/h})R_{ds-on}$ and the feedback voltage $V_{FB}$. When the current is held steady, the duty cycle for the voltage to the high-side FET 302 remains more or less fixed. When the current drops, e.g., due to a drop demand on the load 308 the "off" period increases for the FET 302. During this longer "off" period, the current drops significantly below its previous average value. The feedback voltage $V_{FB}$ is observed to rise slightly during this time but then falls back to a more stable value within a few cycles of the high-side FET 302 gate voltage. Once the new stable current has been established, the high-side FET 302 and low-side FET 304 cycle on and off as before and the current $I_L$ fluctuates about a new steady state DC value.

This behavior may be explained as follows. During the "off" period, the low-side FET 304 is on. The longer low-side FET 304 is on, the lower output voltage $V_O$. The inductor 306 may be regarded as a pseudo-constant current source. The average inductor current $I_L$ is equal to the current to the load 308. When current to the load 308 drops, the inductor L takes time to respond to the change in current to the load 308. Initially, as the current to the load 308 drops, the inductor 306 still keeps the original current. The surplus inductor current can only go to the by-pass capacitor, 310, which can cause the output voltage $V_O$ to rise. The output rise goes to $V_{fb}$ through the voltage divider, 312. As seen from FIG. 3 and FIG. 4 the loop gradually decreases the inductor current $I_L$ to meet new current to the load 308 and maintain the output voltage $V_O$.

In some embodiments a signal related to the current through the load 308 may be sent to the enable input EI of the gate driver IC 301. If this signal is below a predetermined "light load" threshold both of the high-side FET 302 and the low-side FET 304 may be turned off. In this mode, power may be conserved by shutting off the voltage supplied to both FETs 302, 304 during periods of little or no demand for current through the load 308. Ordinarily, the DC current $I_{dc}$ would go to zero when the demand for current goes to zero. However, as may be seen from FIG. 6, due to the constant on-time nature of operation of the controller IC 301 the AC current $I_{AC}$ does not go to zero. As a result, the controller IC would still draw power even though there is no current to the load. Power consumption by the controller IC 301 may be reduced by turning off both FETs 302, 304 during such periods of little or no demand for current through the load 308.

It is noted that embodiments of the present invention do not rely on current emulation and do not inherently place limitations on the inductor that may be used. Furthermore, embodiments of the invention may be used in applications having very low, even zero ESR.

While the above is a complete description of the preferred embodiment of the present invention, it is possible to use various alternatives, modifications and equivalents. Therefore, the scope of the present invention should be determined not with reference to the above description but should, instead, be determined with reference to the appended claims, along with their full scope of equivalents. Any feature, whether preferred or not, may be combined with any other feature, whether preferred or not. In the claims that follow, the indefinite article "A", or "An" refers to a quantity of one or more of the item following the article, except where expressly stated otherwise. The appended claims are not to be interpreted as including means-plus-function limitations, unless such a limitation is explicitly recited in a given claim using the phrase "means for."

What is claimed is:

1. A voltage/current control apparatus, comprising:
   a low-side field effect transistor (FET) having a source, a gate and a drain, wherein the drain of the low-side FET is coupled to ground;
   a high-side field effect transistor (FET) having a source, a gate and a drain, wherein the drain of the high-side FET is adapted to be coupled to an input voltage source, and wherein the source of the high-side FET and the drain of the low-side FET are electrically coupled at a junction;
   a gate driver integrated circuit (IC) having a high-side gate driver output electrically coupled to the gate of the high-side FET and a low-side gate driver output electrically coupled to the gate of the low-side FET;
   a sample and hold circuit configured to sample and store a first input signal proportional to a current through the junction to a load during a portion of a cycle when an "on" voltage is applied to the gate of the low-side FET; and
   a comparator having an output coupled to an input of the gate driver IC, wherein the comparator is configured to receive as inputs some combination of the first input signal with second, third and fourth input signals, wherein the second input signal is proportional to a desired target voltage, wherein the third input signal is proportional to a current through the junction to a load during a current cycle, wherein the fourth input signal proportional to an output voltage across the load, wherein the comparator is configured to produce a trigger signal at the output when a sum of the first and second input signals is equal to a sum of the third and fourth input signals, wherein the trigger signal is configured to trigger a beginning of a new cycle by turning the gate of the high-side FET "on" and the gate of the low-side FET "off".

2. The apparatus of claim 1 wherein one or more of the high-side and low-side field effect transistors is a metal oxide silicon field effect transistor (MOSFET).

3. The apparatus of claim 1, further comprising a current sensor operably coupled between the low-side transistor and the sample and hold circuit, wherein the current sensor is configured to produce the first input signal.

4. The apparatus of claim 1, further comprising a target voltage generator operably coupled to a signal combiner, wherein the target voltage generator is configured to produce the second input signal.

5. The apparatus of claim 1, further comprising a current sensor operably coupled to the junction, wherein the current sensor is configured to produce the third input signal.

6. The apparatus of claim 1, further comprising a voltage sensor operably coupled to the load, wherein the voltage sensor is configured to generate the fourth input signal.

7. The apparatus of claim 1 wherein the sample and hold circuit is configured to update a value of the first input signal based on a value of a drain-source current during a narrow window of time near an end of the cycle.

8. The apparatus of claim 1, further comprising an inductor electrically coupled between the junction and the load.

9. The apparatus of claim 1, further comprising a capacitor coupled in parallel across the load.

10. The apparatus of claim 1, further comprising a load sensing circuit configured to sense a current through the load, the load sensing circuit having an output electrically coupled to an enable input of the gate driver IC, wherein the load sensing circuit is adapted to produce a signal that turns off the gates of both the high-side FET and the low-side FET when the current through the load is below a predetermined light load threshold.

11. The apparatus of claim 1, further comprising:
a first signal combiner coupled to the comparator, wherein the first signal combiner is configured to receive the first input signal and the second input signal and produce a first combination signal proportional to a sum of the first and second input signals.

12. The apparatus of claim 1, further comprising:
a signal combiner coupled to the comparator, wherein the signal combiner is configured to receive the first, third and fourth input signals and output to the comparator a combination signal proportional to a sum of the third and fourth input signals minus the first input signal.

13. The apparatus of claim 1, further comprising:
a first signal combiner coupled to the comparator, wherein the first signal combiner is configured to receive the first input signal and the second input signal and produce a first combination signal proportional to a sum of the first and second input signals.

14. A method for a voltage/current control in an apparatus having a low-side field effect transistor (FET) having a source gate and drain and a high-side FET having a source gate and drain, wherein the source of the high-side FET and the drain of the low-side FET are electrically coupled to each other at a junction, and wherein a load is electrically coupled to the junction;
   a) at the start of a cycle, turning the high-side FET on and the low-side FET off for a fixed time $T_{ON}$;
   b) turning the high-side FET off and the low-side FET on after fixed time $T_{ON}$ has elapsed;
   c) while the high-side FET is off and the low-side FET is on, sensing first, second, third and fourth signals, wherein:
     i) the first signal is proportional to a current during a sample and hold period,
     ii) the second signal is proportional to a target voltage across the load,
     iii) the third signal is proportional to a current to the load,
     iv) the fourth signal is proportional to a measured voltage across the load; and
   d) if the second input signal is equal to a sum of the third and fourth input signals minus a stored value of the first signal from a previous cycle: updating the stored value of the first signal with a measured value obtained during the cycle, and starting a new cycle at a).

15. The method of claim 14 wherein the measured value of the first signal is obtained during a narrow window of time near an end of the cycle.

16. The method of claim 14 wherein a capacitor is electrically coupled in parallel with the load.

17. The method of claim 14, further comprising sensing a current through the load, and turning off both the high-side FET and the low-side FET if the current through the load is below a predetermined light load threshold.

18. The method of claim 14, wherein d) includes generating a first combined signal proportional to a sum of the second signal and the stored value of the first signal, generating a second combined signal proportional to a sum of the third and fourth signals and comparing the first combined signal to the second combined signal.

19. The method of claim 14, wherein d) includes generating a combined signal proportional to a sum of the third and fourth signals minus a stored value of the first signal and comparing the combined signal to the second signal.

* * * * *